US012015806B2

(12) United States Patent
Laakkonen et al.

(10) Patent No.: US 12,015,806 B2
(45) Date of Patent: Jun. 18, 2024

(54) METHOD AND DATA PROCESSING SYSTEM FOR MAKING PREDICTIONS DURING A LIVE EVENT STREAM

(71) Applicant: Noice Entertainment Oy, Helsinki (FI)

(72) Inventors: Jussi Laakkonen, Vacallo (CH); Florian Ziegler, Berlin (DE)

(73) Assignee: Noice Entertainment Oy, Helsinki (FI)

( * ) Notice: Subject to any disclaimer, the term of this patent is extended or adjusted under 35 U.S.C. 154(b) by 0 days.

(21) Appl. No.: 17/017,925

(22) Filed: Sep. 11, 2020

(65) Prior Publication Data

US 2022/0086511 A1  Mar. 17, 2022

(51) Int. Cl.
*H04N 21/234* (2011.01)
*G06N 20/00* (2019.01)
*G06V 20/40* (2022.01)
*H04N 21/2187* (2011.01)
*H04N 21/25* (2011.01)

(52) U.S. Cl.
CPC ....... *H04N 21/23418* (2013.01); *G06N 20/00* (2019.01); *G06V 20/41* (2022.01); *H04N 21/2187* (2013.01); *H04N 21/251* (2013.01); *G06V 20/44* (2022.01)

(58) Field of Classification Search
CPC ......... H04N 21/23418; H04N 21/2187; H04N 21/251; G06N 20/00; G06V 20/41
See application file for complete search history.

(56) References Cited

U.S. PATENT DOCUMENTS

| | | | |
|---|---|---|---|
| 10,904,617 B1* | 1/2021 | Labarre | H04N 21/233 |
| 2017/0223415 A1* | 8/2017 | Jeon | H04N 21/6125 |
| 2018/0167656 A1* | 6/2018 | Ortiz | H04N 21/2187 |
| 2018/0221769 A1 | 8/2018 | Kosai et al. | |
| 2019/0051101 A1 | 2/2019 | Russ | |
| 2020/0186897 A1* | 6/2020 | Dareddy | G06F 18/2155 |
| 2021/0299575 A1* | 9/2021 | Stafford | A63F 13/497 |

FOREIGN PATENT DOCUMENTS

| | | |
|---|---|---|
| JP | 2017055894 A | 3/2017 |
| WO | 2014158029 A1 | 10/2014 |
| WO | 2019201769 A1 | 10/2019 |

OTHER PUBLICATIONS

European Patent Office, Extended European Search Report, Application No. 21185204.1, dated Jan. 7, 2022, 7 pages.
Japan Patent Office, Notice of Reasons for Refusal, Application No. 2021-116808, dated Sep. 28, 2022, 16 pages.

* cited by examiner

*Primary Examiner* — Nicholas T Corbo
(74) *Attorney, Agent, or Firm* — Ziegler IP Law Group

(57) ABSTRACT

A method of operating a data processing system and data processing system for enabling a spectator to make predictions during a live event stream before the predictable events take place, wherein the method is performed by the data processing system comprising a server configured to communicate with a means for transferring the live event stream over a communication network and to provide the prediction environment to the spectator devices for making predictions.

24 Claims, 6 Drawing Sheets

METHOD AND DATA PROCESSING SYSTEM FOR MAKING PREDICTIONS DURING A LIVE EVENT STREAM

TECHNICAL FIELD

The present disclosure relates generally to a method and system for making predictions during a real time event; and more specifically, to a method and system making predictions during a live event stream.

BACKGROUND

There are several online platforms for streaming live events, such as sport events, gaming, concerts, etc. Gaming live streaming platforms enable people to record themselves playing games and to stream it to a live audience online. Another type of streaming platforms provide, e.g. live music and news broadcasting. Several streaming platforms enabling to stream e-sport, in which players compete against each other in video games, sport and other live events provide also betting on the event results. A limitation of such live streaming platforms is that just watching the streamed event and waiting for the results is not engaging enough for many viewers. While betting on the result of the streamed event increases engagement with the streamed event, betting is not allowed in many countries, is typically only available to adults of legal age, is only offered for the very small percentage of all live streamed events, which are popular enough to warrant offering betting and which are professionally organized to avoid match fixing or other game cheating. Moreover, betting involves the risk of losing money, which materially limits the number of people willing to engage in betting. Even when a user wants to bet, is legally allowed to do so, and betting is offered for the event the user is interested in, the user still may not be able bet because transferring money to betting providers may be restricted to payment methods not available to the user. This means for the producers, advertisers, live event participants and streaming platform owners are not able to reach and engage more people, which limits the revenues that can be generated.

Although the streaming platform operators are trying to find solutions to increase the engagement of viewers of the live streamed events, this goal has not been achieved due to lack of product innovation and technical complexities required to support wide variety of different type of events, event participants, different type of hardware, e.g. game consoles, video recording and streaming equipment, etc. used by platform providers and event viewers. Therefore, for streaming platform owners it has proven to be too complicated or too expensive to develop new features for the event participants and event viewers, that would increase the viewer engagement and be compatible with many different requirements.

Some of the betting vendors, some of which also live stream events on their betting sites, enable their users to make bets on the intermediate events taking place during a live event, but these bets are offered only for a very small percentage of live events, the betting options are very limited in the variety and depth of the intermediate events that betting is offered in due to the need of large pool of participating bettors to enable betting liquidity and limitations in what intermediate events can be detected in the live events. The problem is that the known streaming platforms are not able to detect and extract actions of different natures taking place during the live event stream of different natures, that would be predictable in such way that live event stream spectators could make predictions or bets on intermediate events, actions, activities during the live event stream. The live event stream spectators are interested to have more choices to predict that the current platforms do not provide.

Such intermediate events of different natures of the live event stream are activities and actions taking place during the live event, e.g. an e-sports or real-life soccer player kicking a ball into a goal during the live event stream, a computer video game player shooting an enemy or other game participant in a computer generated environment. These actions during the live event can comprise several factors, i.e. sub-event attributes such as movements, locations, equipment, objects which depending on the event criteria, rules, whether it is a real-life or digital event.

Regarding the different type, nature and number of the actions taking place during different type of live events, streaming different type of live events to the devices of the viewers present several challenges due to the large number of possible predictions the streaming platform should be able to prepare and offer to the users for making their predictions before the predicted event actions are performed or executed during the streamed live event. Therefore the problems the known online betting platforms encounter are in defining and recognizing the specific actions taking place during the live event while presenting the predictions based on these possible actions to the spectators for placing bets. The betting platforms require also that there is someone to bet against. If the live event isn't popular, it's not possible to bet as there isn't enough betting activity in the system of the betting platform. Further, the betting sites can't support a large variety of in-play bets even for popular events, because there more varied the in-play betting options are the more diffused bets will become thereby reducing the popularity of individual in-play betting options, which means there may not be any more anyone to bet against for a specific in-play betting option.

Yet another problem of online live streaming platforms is, that the online streaming platforms do not provide participation in an engaging way in live streamed e-sports events for the e-sports enthusiasts and fans of e-sports players. A live e-sports event is where individuals or teams are competing against each other in computer video games. The popular live event streaming platforms enable the viewers to watch the live event in real time and to chat with other spectators. Some streaming platforms offer interactive options to view further info such as statistics of the live streamed e-sports event; enable spectators to predict player or team placements for the whole e-sports event or key stages thereof; provide APIs that enable games themselves or third parties to extend live streaming to integrate this type of functionality on top of the live stream for spectators' use. However, these extensions, interactions or prediction features haven't become very popular because their type of gameplay typically requires mastery of in-game statistics similar to fantasy sports making it inaccessible to most spectators. Further such prediction features typically require the user to make predictions over the whole duration of the live streamed event which may span several days or even weeks by e.g. having the user to predict the winning team in the beginning of a tournament and the results will be available in several days, may be a week later. Typically such prediction features are only offered for the most popular e-sports events and are not available for the very large majority of live e-sports events streamed.

The majority of game live streaming on known live streaming platforms consists of individual game players ("streamers") streaming their own gameplay from their own computer. Watching streamers play video games over these streaming platforms is highly popular, but spectators do not have access to the interactive options discussed above for e-sports events on the known platforms. While popular e-sports events are professionally organized, follow defined tournament rules and have judges and experts to prevent cheating, the streamers are simply live streaming their own gameplay without any of these safeguards that betting platforms require to operate. For these reasons betting is typically not available for streamers' game live streams. While events and sub-events can be detected in popular e-sports events thru integration of data collection systems with the e-sports event's game servers, such integration is typically not available for streamers' game live streams as the game publishers operating the game servers may not make the data available. This means that prediction even when offered is highly limited and interactive features such as statistics discussed are similarly limited or not available at all.

Therefore, in light of the foregoing discussion, there exists a need for a method and a system that overcomes the problems and enables online live event spectators to watch the live events in a more engaging way.

SUMMARY

The present disclosure seeks to provide a method of operating a data processing system and a data processing system to provide for spectators of a live event stream to participate in watching the live event stream in a more engaging way by enabling to the spectator to make predictions during the live event stream, wherein the live event can be a real-life event or a digital event (e.g. an e-sports event or a live stream of someone playing a video game) or any other streamable content which can be e.g. streamed as a video stream. The present disclosure seeks to provide a solution to the existing challenges of presenting the predictable events, actions and activities taking place during the live event stream to spectators of live event stream before the predictable events, actions and activities take place in the live event. An aim of the present disclosure is to provide a solution that overcomes at least partially the problems encountered with the use of conventionally known methods and systems and provides an improved method and system that facilitate a spectator to make predictions during the live event streaming before the predictable event actions take place (e.g. the predictions can be made seconds, minutes or one or more hours or even days before the predictable event takes place).

In one aspect, an embodiment of the present disclosure provides a method of operating a data processing system for making predictions during a live event stream, wherein the live event stream comprises a video stream, and the live event stream is received from a means for transferring the live event stream in a server, the method comprising the steps of: defining a category of the live event to be streamed from the server to at least one spectator device; defining a set of predictable event actions of the live event according to the defined category of the live event; associating each predictable event action of the set of defined predictable event actions with an electronic prediction means; providing the electronic prediction means associated with the defined predictable event actions to at least one spectator device of at least one spectator; generating a data stream of predictable event actions from an event data source; recording in the server a data of the event actions being predicted, from the at least one spectator device; streaming the live event corresponding to the defined category of the live event received from the means for transferring the live event stream by the server to the at least one spectator device; detecting event actions from the generated data stream; comparing the recorded data of the event actions being predicted and the detected event actions from the generated data stream to identify the prediction results; and displaying the identified prediction result on a display of the at least one spectator device.

In another aspect, an embodiment of the present disclosure provides a data processing system for making predictions during a live event stream, wherein the live event stream comprises a video stream and the live event stream is received from a means for transferring the live event stream, the data processing system comprising: at least one spectator device operable by the spectator; and at least one server in communication with the at least one spectator device over a communications network, wherein at least one of the server configured to: define a category of the live event to be streamed from the server to at least one spectator device; define a set of predictable event actions of the live event according to the defined category of the live event; associate each predictable event action of the set of defined predictable event actions with an electronic prediction means; provide the electronic prediction means associated with the defined predictable event actions to the at least one spectator device for selection by the at least one spectator; generate a data stream of predictable event actions from the video of the live event to be streamed; record a data of the event actions being predicted, from the at least one spectator device; stream the live event corresponding to the defined category of the live event received from the means for transferring the live event stream to the at least one spectator device; detect event actions from the generated data stream; compare the recorded data of the event actions being predicted and the detected event actions from the generated data stream to identify the prediction results; and display the identified prediction result in a user interface of the at least one spectator device.

Embodiments of the present disclosure substantially eliminate or at least partially address the aforementioned problems in the prior art, and enable users of digital devices to engage with a live event in a realistic and more engaging manner and make predictions in conjunction with intermediate events, actions and activities that could occur during the live event. The embodiments of the present disclosure enable to facilitate making predictions during the live event stream and thereby engage the live event spectators to participate more actively in the live event and enhance the user experience of the spectators.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

Embodiments of the present disclosure will now be described, by way of example only, with reference to the following diagrams wherein.

DETAILED DESCRIPTION OF EMBODIMENTS

Figure 1:
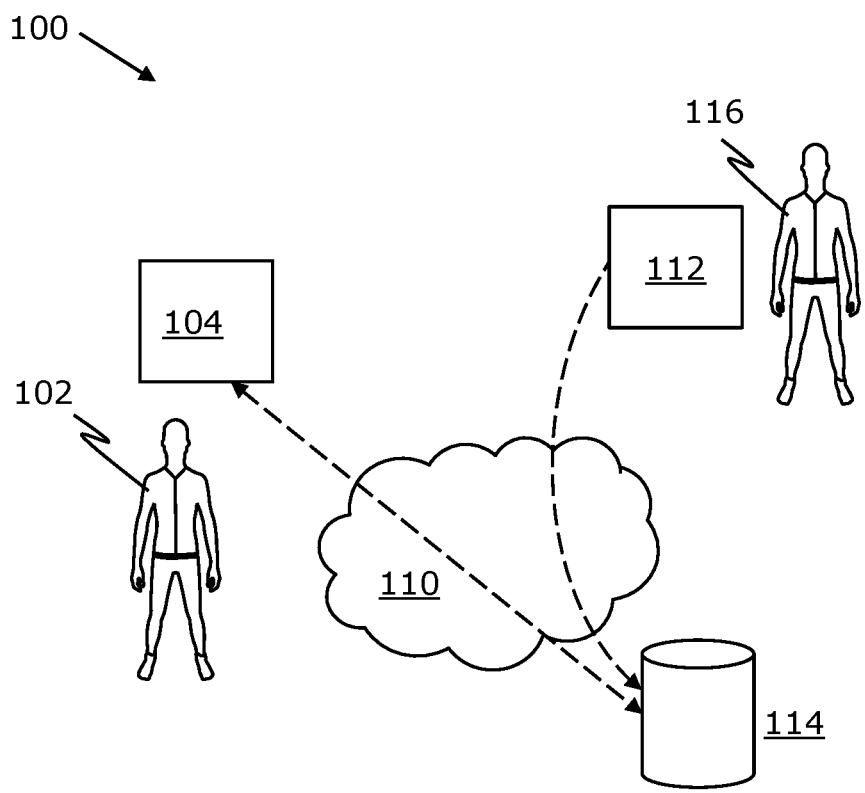
FIG. 1 is a schematic diagram showing a data processing system for enabling a spectator to make predictions during a live event stream, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. For clarity purposes the terms used throughout the present disclosure are specified as follows.

The term "spectator" is used to denote any viewer who is watching the live event stream on a spectator device and who is enabled by the data processing system to predict event actions performed by the participants participating in the live event and who at least wish to make a selection of at least one electronic prediction means. The spectator can provide predictions of what is going to happen in the future during the live event stream. More specifically, the spectator can predict which of the defined predictable event actions will take place, by which player and how the action is performed and when those actions will happen.

The terms "participant" and "event participant" refer to one or more players of the computer game, one or more players of the computer game playing against each other, a group of players of the computer game playing together or playing against another group of players, a single player of the computer game playing in a multiplayer networked game where others aren't participants, players or participants of a real-life sport events, live concert or other live event. In some examples of the embodiments of the present disclosure instead of "participant" a term "player" has been used in relation to the corresponding example. In such embodiments the event participants are one or more players of the computer game such as war game, strategy game, soccer, basketball, etc., wherein each player by using a computer or some other suitable electronic device connected to the data processing system generates a data stream comprising data associated with the actions performed during the gaming. In single or multiplayer computer game the participant can also be a streamer, who streams the live event stream of his play from his device being used for playing the computer game to the server of the data processing system.

The term "spectator device" refers to a single device operated by a single spectator or the spectator may have multiple devices connected, e.g. a big screen TV for viewing the stream and a smartphone for doing predictions. The spectator device may be e.g. a phone, a tablet, a phablet, a computer, laptop, PC, smartphone, VR/AR headset, terminal, smart TV or any other type of device commonly known to persons in the art for having a display that is rendered using a graphical user interface (GUI) enabling to display the online live event stream. The term "participant device" refers to a game console, a computer, a tablet, a smartphone or other device enabling the participant to attend at live event, play computer game or video game.

The term "means for transferring a live event stream" refers to equipment capable to provide a stream of a live event directly to the data processing system according to the present disclosure or which receives the live event video recording from the live event (e.g. a sporting event, concert, TV show, etc.) recording system and broadcasts the live event over the communication network in real time to the data processing system. The means for transferring the live event stream can be for example one or more event recording system or one or more devices of one or more event participants or one or more servers connecting devices of the participants (e.g. computer, laptop, smartphone or other device having a capability for video recording and transferring the recorded video to the data processing system) that captures the audiovisual output of the computer game and optionally the game data, and streams the video capture and optionally the game data in real time to the server of the present data processing system. In different embodiments the server of the present data processing system may receive the live event stream from different sources. These can be for example: a) devices of one or more streamers (i.e. event participants) which transfer the video stream directly to the server (i.e. the video is captured from the streamer's device and transferred to the server); b) devices of one or more players of the multiplayer computer game are connected to the game server, which transfers the live event stream to the server; c) one or more smartphones recording the real life live event and transfer the recorded video directly to the server; d) one or more video cameras recording the real life live event, sending the recorded video to the server of the event organizer (i.e. in such cases the event server as used in the present disclosure) which transfers the video to the server of the data processing system. In all embodiments the means that transfer the video and/or data of the live event to the server is "means for transferring the live event". According to this in example a) the "means for transferring the live event" is the streamer's device; in example b) the "means for transferring the live event" is multiplayer game server, which can be a dedicated server for the event (operated by the event organizer or by game publisher) or a normal game server (operated by the game publisher) used by any game players; in example c) the "means for transferring the live event" is the device used for recording and transferring the video of the live event, e.g. smartphone. The example d) illustrates live video transmission, which may require an intermediate server and in such embodiment the "means for transferring the live event" is the intermediate server, which in present disclosure is used as "event server". The term "event recording system" refers to devices enabling to record the live event and transfer the recording to at least one electronic device and/or server.

The term "electronic prediction means" refers to predefined selectable objects or selectable fields provided to a spectator in the user interface of the prediction environment via the spectator device to enable the spectator to make predictions. The term "prediction environment" refers to an application running in the electronic device the spectator is using for watching the live event streams and making the predictions.

The term "live event category" refers to a type of the live event and defines what type of event actions may take place during the live event. Live event category is e.g. e-sports or computer gaming events (e.g. football match, war game, action game, fantasy game, running event, etc.), live video, live sporting event, TV live show. The live event category may have sub-categories, e.g. in the computer games category there may be different type of computer games such as specific shooting games, specific car racing games, specific sports games, etc., and each sub-category may have its own more specific categories such as a specific game mode of that specific game, which the possible event actions and corresponding predictable event actions in more detail.

The term "event action" refers to actions, activities, sub-events caused, performed or initiated by the participants of the live event in the live event. The term "sub-event attributes" refers to predictable and detectable event actions by defining which participant of the multiple participants or group or participants participating in the live event performs which type of actions, how, where, and when the action will be performed. The term "triggering action" refers to actions performed during the streamed live event by a specific live event participant at a certain time moment t. The term "event replay data" may be regarded as a recording of an earlier live event and its concomitant data. The term "defined predictable event action" refers to event actions taking place in the event during the live event stream defined by the data processing system and depending on the event category, specific event in its category and the rules of the corresponding event, wherein the defined predictable event action can be pre-defined before streaming a certain live event, can be re-defined after defining or the event actions taking place in the same event can be defined in different ways depending to whom the corresponding live event is streamed.

In one aspect, an embodiment of the present disclosure provides a method of operating a data processing system for making predictions during a live event stream, wherein the live event stream comprises a video stream, and the live event stream is received from a means for transferring the live event stream in a server, the method comprising the steps of: defining a category of the live event to be streamed from the server to at least one spectator device; defining a set of predictable event actions of the live event according to the defined category of the live event; associating each predictable event action of the set of defined predictable event actions with an electronic prediction means; providing the electronic prediction means associated with the defined predictable event actions to at least one spectator device of at least one spectator; generating a data stream of predictable event actions from an event data source; recording in the server a data of the event actions being predicted, from the at least one spectator device; streaming the live event corresponding to the defined category of the live event received from the means for transferring the live event stream by the server to the at least one spectator device; detecting event actions from the generated data stream; comparing the recorded data of the event actions being predicted and the detected event actions from the generated data stream to identify the prediction results; and displaying the identified prediction result on a display of the at least one spectator device.

In different embodiments the event data source may comprise for example the video of the live event to be streamed, a data stream from a e-sports or computer gaming event or from any other live event, an application program interface, a software development kit or combination thereof.

In an embodiment the method is performed by a data processing system comprising a server configured to communicate with a means for transferring the live event stream over a communication network, to provide the prediction environment to the spectator devices, and to perform the steps of the present method. In different embodiments the server comprises at least on of an object and event detection engine, a prediction processor, a prediction environment engine and rendering engine, wherein the rendering engine may be also in the spectator device.

In an alternative embodiment, the present data processing system is configured to be self-correcting with the help of the spectators. The spectators will be viewing the video of the live event stream and see the results of the detected data, and thus can identify and flag cases in which machine learning generated data is incorrect, thus helping to improve the data processing system.

In an embodiment, the data stream is generated in the server of the present data processing system through analyzing the video stream through machine learning based on an object and event detection engine for visual object and event detection and recognizing events from data and video streams, such object and event detection engine having been trained with event replay data. Such a server-side object and event detection engine may be run without data stream from the game (e.g. from the participant device or a game server) or in conjunction with such data stream. Alternatively, the data stream is captured from or provided by the game client or from the game server.

The real time object and event detection engine is configured to detect events and actions taking place during the game may be implemented as a machine learning system. Such machine learning system would be trained using event replay data from previous events, as such event replay data can be used by the game to completely re-produce the game session including the game's audiovisual output. Event actions can be detected from the event replay data, from the re-produced game session and further event actions can be manually annotated. These event actions are then used together with the re-produced game audiovisual output for training the machine learning algorithms to detect the event actions in other video streams of the same game. The machine learning object and event detection engine can be executed either on the server of the data processing system or on the participant's device analyzing the video capture stream from the game being live video streamed.

The event actions that participants are performing during the live event depend on the live event category, on the particular event and on the particular event mode of the corresponding event, both of which can change over time as event is being updated. Further these depend on the content of the event: e.g. if the event is an organized tournament, there may be specific rules that apply, which can differ from another tournament played with the same event. Each live event category is associated with event actions of said live event category that may happen during the event. Event action can be e.g. a goal (e.g. in the live event category of a football match), scoring a hit with a specific shotgun (e.g. in the live event category action game's sub-category of a specific game), etc. Each event action can be associated with event action parameters. Event action parameters define a set of rules related to the event action such as how many points are awarded to the spectator for making a correct prediction.

During streaming the live event, in addition to the video of the live event, the live event stream may comprise additional data, such as data from the event, presented in the prediction environment of the data processing system according to the present disclosure, such as leader boards of the spectators who have made most successful predictions; scores of competing groups of spectators.

The defined set of predictable event actions comprise at least one of the sub-event attributes such as predictable action types (e.g. gunshot, explosion, type of weapon used, location where opponent was hit; goal, yellow card, red card, corner; etc. depending on the live event category and combinations of these with different time, recurrence, etc. conditions (e.g. triple kill in under 20 seconds), three rounds won in a row), which actions of the predictable action types will take place, by which player, how the action will be performed, linked predictable events (i.e. an event can only happen if a specified event preceded it) or at what time moment the predicted action will happen during the live event stream.

More specifically, the sub-event attributes can be e.g. the goal kick the player performs on a football field, or that the goal is scored by a specific player, how the goal is performed (e.g. by leg or by a head), a location on the soccer field from where the player performs the goal kick, the time when the goal kick is performed, a fault committed by a player of specific identity or a player from a specific team. Or as in another example shots or kills by specific weapon at a specific location, missions completed and other actions in computer war or strategy games performed by a specific player or a specific team. Other examples of sub-event attribute include e.g. winner of the match, team is leading at half-time, team wins a round killing all opposing team players, a specific player performs at least one kill in the next three rounds, or a negative of these such as the team has not performed any damage or kill for 30 seconds.

Depending on the live event category, the predictable event actions may comprise other predictable sub-event attributes such as location in the game (e.g. basement, storage room, bridge, garage in war game; penalty area, central area in the soccer game; etc.). Each of the participants generates an additional data comprising information related to the activities performed during the computer game. The additional data is received in the server, which is configured to analyze the received additional data, detect the sub-event attributes and generate a corresponding sub-event code.

Alternatively, there can be also scenarios in which there's a multiplayer game of for example hundred participants, and the data processing system is configured to receive the data from one participant either thru the participant device, thru the game server or thru the machine learning system analyzing the live event stream on the server.

Further, in case of a game live stream, the host of the game live stream (i.e. a streamer) is able to enable spectators to predict his gameplay by providing spectators specific electronic prediction means. The host of the live stream can provide one or more predictable event actions that the spectators can choose from to predict how the host will do in the game he's currently playing. This enables to add more engagement to the live stream.

The electronic prediction means may be in the form of predefined selectable objects, wherein each selectable object presents one defined predictable event action (e.g. player no. 7 from team 1 kills player number 3 from team 2 by gunshot at the time moment t3); or as selectable fields, wherein each selectable field corresponds to the sub-event attribute (i.e. a list of players, list of actions that players may perform or actions that may happen during the event, list of activities how the action is performed, list of locations where the action will happen, list of the time moments when the action may take place) comprising a list of sub-event attributes from which the spectator can choose the sub-event attributes to be predicted, e.g. which participant of the multiple participants participating in the live event which type of actions and how the action will be performed at what time moment.

The electronic prediction means comprise information related to predictable actions such as "participant XX in the live event YYY (e.g. soccer game, war game, etc.) will make an action ZZZ (e.g. a goal in soccer, completes a task or mission in a war game, etc.) using corresponding means depending on the event (e.g. using his head in a soccer game; a shotgun in a war game)". The electronic prediction means comprise information for the spectators and sub-event attribute data generated by the data processing system. The spectator is provided with the user interface of the prediction environment in a suitable device to use one or more electronic prediction means to make a prediction of next or coming actions during the live event stream. The electronic prediction means may not be made available to the spectator during a defined time periods and during such time periods the spectator may not yet have any predictions means selected.

The electronic prediction means are provided to the spectator by displaying a user interface of a prediction environment in the spectator device during a predefined time window when the predictions will be accepted, wherein the time window may be longer than the live event, and there can be multiple time windows during a game (e.g. make a prediction between every round, or make new predictions at half-time). Further spectators may be enabled to make new predictions or to change their existing predictions at any time, with such actions possibly being limited in how many times they can be done or incurring a cost or reducing a benefit in the calculation of prediction outcomes or rewards. This time window may be made accessible to the spectators before the beginning of the streamable live event or during the live event stream by superimposing the prediction environment as for example an overlay graphics or the time window may be made accessible by providing the time window in a separate window to the video stream, or on the separate devices showing video of the live event stream and user interface of the prediction environment (e.g. watch the video stream on the big screen TV and make predictions on e.g. a mobile phone).

The predictions initiated by the spectators by using the electronic prediction means are received in the server. The selectable objects link to a specific predictable event. The analysis of the one or more generated data streams of the live event will identify all predictable event actions that occur in the live event and then will match those to all predictions made by the spectators. Each streamed live event may have hundreds of thousands or millions of concurrent spectators. The spectators can make the predictions individually or in teams or groups. So, the live event may be streamed to the individual spectators or the group of spectators.

The generated data stream may in an embodiment be the data stream generated from a video of a live event stream from a device of a single video game participant, who is playing on a server against for example 100 other participants, or a data stream generated from a video of a live event stream from one or more devices of one or more teams competing for each other, data streams generated from a video of a live event stream from one or more devices of the participants competing against each other individually etc.

The live event stream is received from one or more stream sources, i.e. means for transferring the live event stream, by an object and event detection engine of the data processing system to detect triggering actions from the live event stream. The live event stream may comprise one or more video streams of the gameplay, one or more video streams of the event participants, commentator stream and data streams such as event statistics. Triggering actions are detected at least by implementing a software interface library configured to interface with the game being played, or analyze the data or the state of the game being played; by performing a real time video or audio and video recognition and analysis of one or more live streams from the event or by using real time statistics feed of live event stream. These triggering actions may therefore, be understood as being of interest to the spectator. These triggering actions may include predictable event actions including, but not limited to, a goal by the participant in the game of football, or a kill made by the participant A for eliminating the opponent participant B in an e-sports event. The triggering action may comprise multiple actions (e.g. smaller actions or sub-actions) to be detected in the generated data stream. The actions taking place in the sub-event during the live event stream are triggering actions. The server is configured to create sub-event attributes, i.e. data (a function of time), of the input content (i.e. e-soccer game which is streamed). If the sub-event attribute data of the selected electronic prediction means corresponds to the triggering action, a resource is awarded to the spectator. Resources can be for example recognition, badges, achievements, points, score, virtual currency or money, cryptocurrency or another digital or physical reward. The resources can also be variable based on probability or popularity of predictions, i.e. dependent on what other spectators predict, so e.g. a very popular choice may be rewarded differently than a less popular choice (e.g. to reward contrarian predictions).

In an embodiment, the data processing system is configured to generate sub-event attributes by detecting and identifying the triggering actions. The triggering actions are identified for example by real time analysis of a video of a live event stream to detect and identify event actions by object and event detection engine with machine learning using a real time statistics feed or a real time event statistics database of live event stream or by software interface library for detecting an action type and time when the action happens. The software interface library may run on the device of the participant or on the game server and collect data directly from the game client or the game server or integrate with an API to the game client on the participant device or to the game server.

The live event to be streamed comprises sub-events caused by actions performed by the participants of the corresponding event, i.e. event actions. The data of the event actions being predicted and the data of the corresponding sub-event attributes based on the detected actions during the live stream can be used to trigger award or point calculation system (i.e. the resources to be allocated).

The identified prediction results may be displayed on the spectator device from where the corresponding prediction was initiated; on any spectator device of any other spectator; or on the spectator device from where the corresponding prediction was initiated and on any spectator device of any other spectator.

In an embodiment, generating the data stream is performed by analyzing the video stream using a machine learning algorithm based on at least one object or event detection technique. Using the machine learning algorithm according to the present disclosure further comprises training the machine learning algorithm by using event replay data for generating the data streams and for re-producing the events in the game(s) including the events' audiovisual outputs and event actions.

In the embodiment, the machine learning algorithm is implemented as self-learning machine learning algorithm by initiating a real time object and event detection from the game data. Such a machine learning system is trained by the data processing system using existing event replay data, which enables the data processing system to reproduce the game session including the visuals. The event actions of the live event can be detected from the live event replay data, e.g. from the replayed game session and further game events can be manually annotated. These event actions are then used together with the re-produced visuals for training the machine learning algorithms. The machine learning object and event detection engine is configured to run either on the one or more servers of the data processing system or the game participant device analyzing the video capture stream from the underlying game.

In another embodiment generating the data stream is performed by analyzing in the server the event data received from one or more participant devices, from one or more game servers or from the means transferring the live event stream. The means for transferring a live event provides a live event stream from one or more participant devices or live event servers to the data processing system according to the present disclosure. The live event stream is provided over a communication network to one or more spectator devices or through the server of the data processing system to the spectator devices. The data processing system comprises a server configured to receive the live event stream from the means for transferring the live event stream and provide the received live event stream and the prediction environment to the user interface of one or more spectator devices or in another embodiment only the live event stream if the prediction environment program is already installed and activated in the spectator device. The spectators may participate in the streamable event by making the predictions individually or in another embodiment the spectators may form one or more teams and make the predictions in groups. The one or more spectator devices can access to the server via a communication network. The spectator devices can also access partly or to all the live event streams of live events either directly from the means for transferring the live event stream, from a live event server or via the server of the data processing system. The server can be a dedicated server, cloud service, distributed server, the communication network can be internet, etc. Connection from the spectator device to the communication network can be wired or wireless. The live event can be a real-life event such as a football game, sporting event or it can be a computer video game such as an e-sports event. The content from the live event can be rendered with the participant device or with the means for transferring the live event stream.

In an embodiment a live match tournament as a live event (happening online or in actual physical location) is streamed online; the one or more video of the streams is received from the one or more means for transferring the live event, e.g. one or more servers of the tournament location or a device connected to the event server, recording the live event and sending video of the recorded live event stream to a server of the data processing system; a data stream is generated by an object and event detection in the server or received via the means for transferring the live event. The data stream is used to detect the event actions and when the event actions take place during the live event. The tournament is streamed to the audience representing individual spectators watching the match, i.e. massive multiplayer game, hundreds of thousands or millions of concurrent viewers, wherein each spectator can make its own predictions individually or in teams. The data and video streams are received in the server, which is configured to analyze each of the received data and video stream, detect the sub-event attributes and generate a corresponding sub-event code.

In another aspect, an embodiment of the present disclosure provides a data processing system for making predictions during a live event stream, wherein the live event stream comprises a video stream, or in an another embodiment the live event stream may comprise a video stream and an additional data stream, from a means for transferring the live event stream, the data processing system comprises: at least one spectator device operable by the spectator; and at least one server in communication with the at least one spectator device over a communications network, wherein at least one of the server is configured to: define a category of live event to be streamed from the server to at least one spectator device; define a set of predictable event actions of the live event according to the defined category of the live event; associate each predictable event action of the set of defined predictable event actions with an electronic prediction means; provide the electronic prediction means associated with the defined predictable event actions to the at least one spectator device for selection by the at least one spectator; generate a data stream of predictable event actions from an event data source; record a data of the event actions being predicted, from the at least one spectator device; stream the live event corresponding to the defined category of the live event received from the means for transferring the live event stream to the at least one spectator device; detect event actions from the generated data stream; compare the recorded data of the event actions being predicted and the detected event actions from the generated data stream to identify the prediction results; and display the identified prediction result in a user interface of the at least one spectator device.

In different embodiments the event data source may comprise for example the data stream from the video of the live event to be streamed, a data stream from a e-sports or computer gaming event or from any other live event, an application program interface, a software development kit or combination thereof.

The data processing system and method allow the online live event stream spectators to provide predictions on actions going to happen during the live events. The live event stream is being watched by the spectator minute-by-minute and the predictions are initiated by using electronic prediction means that represent defined possible predictable event actions in a user interface of the prediction environment installed into spectator's device is configured to communicate with the server of the data processing system. The data processing system enables to provide to the spectators means to make predictions on what is going to happen during the live stream. If the provided prediction is accurate the spectator is awarded resources.

To provide such a real-time or near real time generation of detailed event action data from the video of the live event stream is the main aim of the embodiments of the present disclosure enabling to solve the problems known in the prior art. In some embodiments, the generation is of actual data (if e.g. the analysis is done through visual recognition of a video feed) and in other embodiments data from raw game data.

The video of the live event to be streamed, the event participants, commentary and e.g. audience sounds may be different streams or a single stream. Due to the unforeseen reasons there may be unintentional delays (e.g. live stream delayed by e.g. 10 seconds) or communication network caused delays, lag or buffering during the live event stream. During such unintentional delays during the live event to be streamed the audience members at the live event may also continue to participate on making predictions and if so, the data processing system is configured to inform the affected participants via the user interfaces of the prediction environment to treat corresponding spectators differently (they are e.g. 10 seconds ahead of all others).

According to an embodiment, the live event stream is transferred over the means for transferring the live event stream to one or more servers, the one or more servers, when connected to the one or more spectator devices, are configured for scaling and handling geographically distributed spectator bases. In another embodiment where the means for transferring the live event stream receive the live event stream to be transferred from more than one game servers or shared game servers, i.e. separate game played on each server, the data processing system is configured to sync the multiple live event streams. By streaming the live event close to real-time and synchronizing the one or more live event streams comprising video or video and event data, and statistics, the embodiments of the present disclosure enable to avoid cheating and provide an prediction environment where spectators' actions are happen nearly in real time and/or are synchronized. In different embodiments of the present disclosure the live event stream transmission may be performed via an intermediate server, but also may be directly connected to the server of the present data processing system. For example, in an embodiment where a multiplayer game server, which can be a dedicated server for the event (operated by the event organizer or by game publisher) or a normal game server (operated by the game publisher) may be used by any event participants.

The event to be streamed comprises actions that will be initiated by the participants in the event to be streamed. The live event is streamed by the data processing system by receiving the live event stream, processing at least one event data source by the server of the data processing system to generate a data stream of the event data and data stream of predictable event actions and streams the live event stream and provides the prediction environment to the one or more spectator devices, wherein the prediction environment my comprise spectator specific data, e.g. what predictions can be made, what predictions happened, etc. The event data source may be for example the video of the live event stream, a data stream from a e-sports or computer gaming event or from any other live event, an API or Software Development Kit (SDK). If, for example, there's a data stream from the computer gaming event, then the video stream may be optionally analyzed to generate further event data. The prediction made by the spectator is compared by the prediction environment engine of the server with the generated data and identified is the prediction right or wrong. The prediction is done before the predictable event takes place (tp<t2).

The server is configured to communicate with the means for transferring the live event stream over a communication network to receive the live event stream and provide the received live event stream to one or more spectator devices, provide to one or more spectator devices a prediction environment comprising one or more electronic prediction means during a predefined time window.

In an embodiment the present disclosure provides the data processing system for enabling the spectator to make predictions during the live event stream, wherein the live event can be organized in one or more live event servers. The one or more live event servers may comprise a combination of one or more game servers. The live event server is related to e-sports event in the corresponding embodiment, wherein an event participant, i.e. computer game or video game player, playing a game on a participant device. The live video stream related to the game view (sounds, video etc.) is streamed by the data processing system according to the embodiment. The participant device can be configured to provide raw game data (movements, scores etc.) over game data application program interface (API) or it can be extracted from the game's data files or the game state by the software interface library. This can be implemented as a built-in software module for the game client provided to the participant device or it can be separate executable software. In the same way in generic game server, raw game data, API and software interface library can be provided as well as video streams. There can be an arbitrary number of participants of the computer game each playing the same game at the same time.

In an embodiment, there can be a live camera stream from the human players to capture motions and feelings of the players or other camera streams from the audience and commentators of the game. In an embodiment, the data processing system comprises an object and event detection engine which can also be configured to extract data from live event streams and generate data to be used.

In another embodiment the means for transferring the live event stream is a game server providing e-sports players, i.e. event participants, e-sports computer game or video game matches, competitions and tournaments, wherein individual players or teams compete against each other.

The data processing system also comprises at least one spectator device that is in communication with the means for transferring the live event stream (e.g. with the game server in the embodiment, wherein the game server comprises the means for transferring the live event stream) and/or with the server over a communications network. Moreover, in some embodiments, the spectator using the spectator device may be remotely located from a venue of the live event while, in other cases, the spectator may be located in the same venue from where the live event is being transferred by the live event server to the server before the server streams the live event stream to the spectator device. Regardless of the locations of the spectators, the live event stream is relayed in a real or near-real time manner with the live event or alternatively streaming the live event may be delayed intentionally. As with the server, the spectator device used by the spectator may also be configured to perform one or more functions that are consistent with the present disclosure, as will be explained later herein.

In cases where the communications network such as the Internet, or any other radiofrequency bandwidth such as Television Cable Services (TCS), or the Ethernet is used for communications within a distributed user configuration, multiple servers may be used as data handlers depending on specific requirements of an application. As an example, specific requirements may include e.g., data processing system architecture based on a geographic location of the spectator. Additionally, or optionally, specific requirements disclosed herein may include application specific requirements, e.g., to incorporate a prediction feature, a scorecard feature, or any other feature within a live event streaming application.

The data processing system is configured to provide in a user interface of the spectator device an electronic prediction environment allowing the spectator to select the category of live event and specific live event to be streamed. Irrespective of the data processing system architecture selected, the spectator device and the server are configured to communicate one another by means of communicating data over selected communications networks.

Additionally, the data processing system is configured to define the set of predictable event actions of the live event according to the selected category of the live event. When the server is used to define a set of predictable event actions of the live event, the server may be configured to execute code via a set of written instructions thereon, or alternatively the spectator device itself may be of a type, for example, a thin client (TC), that can be configured to execute a similar, or another, code via a set of written instructions thereon for operably defining the set of predictable event actions in the live event based on the spectator's desired and chosen category of the live event. However, the spectator may input such desired and chosen category of the live event using the GUI associated with the display on the spectator device.

The data processing system is configured to associate each predictable event action of the set of defined predictable event actions with the electronic prediction means. The predictable event action may be any type of action that is predicted to occur within the selected category of the live event, e.g., a goal, a penalty or a corner kick in a live game of football, or a particular type or method of kill, a kill count, or a final win of a team in an online multiplayer war game. An electronic prediction means is linked to each predictable event action.

As an example, a first selectable object or selectable field for the live event category football may include a prediction of whether one or more participants of team A will score a goal in the first half of the game, while a second selectable object or selectable field for the same category may include a prediction of whether one or more participants of team B will score a goal in the second half of the game. Additionally, a third selectable object or selectable field may include a prediction of whether one or more participants of team A will score the goal using a head-butt (a head-shot), or a fourth selectable object or selectable field may include a prediction of whether one or more participants of team B will score the goal using a corner kick, a penalty shoot-out, or another manner of game play.

In another example, a first selectable object or selectable field for an e-sports category "Call of Duty®" may include a prediction of whether one or more participants of team A will kill one or more participants of team B, while a second selectable object or selectable field for the same e-sports category may include a prediction of whether one or more participants of team B will kill one or more participants of team A. Additionally, a third selectable object or selectable field may include a prediction of whether such event actions by one or more participants of team A (or one or more participants of team B) be made in the first round of the game or the second round of the game. Alternatively, or additionally, a fourth selectable object or selectable field may include a prediction of whether the event actions made by one or more participants of team A would be in a specific location, for example, in a basement of a warehouse, on a terrace of a house, or at a swamp by the river.

It may be noted that the foregoing examples of electronic prediction means and the correspondingly linked predicted event actions are merely illustrative and hence, non-limiting of this disclosure. Therefore, persons skilled in the art will acknowledge that various other types of predicted event actions can be implemented via respective electronic prediction means in lieu of the foregoing examples and that gaming nomenclature may vary based on a type or category of the live event, for example, sport such as football, or an e-sports such as "Call of Duty®".

The server is configured to provide the electronic prediction means associated with the defined predictable event actions to the spectator device for selection by the at least one spectator. The spectator may provide inputs by selecting one or more desired electronic prediction means using the GUI of the prediction environment associated with the display on the spectator device.

The server and/or the participant device are operable to generate data of event actions being predicted. In an embodiment, the generating the data stream of predictable event actions further comprises receiving at least one prediction input related to the defined predictable event actions from the at least one spectator device of the at least one spectator in response to the provided electronic prediction means associated with the defined predictable event actions; and processing the received at least one prediction input to generate data of event actions being predicted.

The server may receive at least one prediction input related to the defined predictable event actions from the at least one spectator device of the at least one spectator in response to the provided electronic prediction means associated with the defined predictable event actions, and process the received at least one prediction input to generate data of event actions being predicted. Once an electronic prediction means, for example, one or more selectable objects or selectable fields is selected by the spectator via the prediction environment in the user interface of the spectator device, the server receives the selection as the prediction input from the spectator device. The server or the spectator device processes the live event stream to generate the data stream. The data processing system is configured to receive the live event stream from one or more participant devices of one or more participants for generating the data stream of event actions to be predicted.

In an embodiment, generating the data stream in the server further may comprise receiving one or more of: event-based analysis, event-based statistics, and event-based commentary. For example, the event-based analysis may include attributes i.e., aspects relating to how, where, when or what specific event action is taking place.

In another embodiment, the data stream generated in the server from the actions performed by the participants of the streamed live event may comprise event-based statistics. In an example, the event-based statistics may include statistical data pertaining to a number of goals scored by a player in a game of football. In another example, the event-based statistics may include statistical data pertaining to a number of attempts made to score a goal by the player in the game of football.

In yet another embodiment, the data stream generated in the server from the actions performed by the participants of the streamed live event may comprise event-based commentary. In an example, the event-based commentary may include commentator inputs regarding the state of game play or commentary pertaining to a manner in which specific event actions are occurring, for example, if a player is scoring a goal using a head-shot or a kick.

It is hereby also contemplated that in an alternate embodiment, the data stream generated in the server from the actions performed by the participants of the streamed live event may comprise a combination i.e., two or more event-based analysis, event-based statistics and event-based commentary.

In an embodiment, the generating the data stream comprises generating information about a type of action, location where the event action is predicted to take place, identity of a performer of the action, a time of occurrence of the corresponding predictable event actions in the live event stream or dependency on a preceding predictable event action. The data stream generated in the server from the actions performed by the participants of the streamed live event helps to enhance the spectators' experience of participation and increase a level of engagement with the live event stream.

In an embodiment, the at least one of the servers of the data processing system or the spectator devices is operable to generate the data stream by analyzing the video stream using a machine learning algorithm residing thereon, the machine learning algorithm based on at least one object and event detection technique. Various commonly known object and event detection APIs such as, but not limited to, TensorFlow may be implemented to detect a class or type of each object in the live event stream. The object and event detection API used may detect a first object as being, e.g., a player and a second object as being, e.g., a ball in the live event stream of a football game. In addition to the classes of objects, the object and event detection API may also be configured to detect states of individual objects in the live event stream. E.g., the object and event detection API may detect states of objects, e.g. the player running up to the ball, the leg of the player being raised prior to kicking the ball, or the ball being mid-air after the player has kicked the ball.

In an embodiment, for generating the data stream, the at least one server is further configured to train the machine learning algorithm by using an event replay data for generating the data and video streams. For example, event replay data may include a number of corner kicks made by various players from previously known live event streams of football games, or a number of mid-field kicks made by players kicking the ball from previously known live event streams of football games. This way, by using the event replay data the visuals of the event are re-produced and analyzed to extract predictable events, which together are used to train the machine learning algorithm. The machine learning algorithm can be trained for subsequent use in generating the data stream from a live event stream with improved consistency and accuracy.

Further, the server is operable to stream the live event corresponding to the selected live event category, from the means for transferring the live event stream to the at least one spectator device. The spectator device is configured to receive the stream of the live event for displaying the live event via the user interface of the prediction environment and making predictions on the predicted event actions via a selection of the desired electronic prediction means of the prediction environment. For example, if the spectator provides an input, via the GUI of the display of the spectator device, for selecting a desired live event from a corresponding live event category to watch, then the server streams the live event, e.g. football game, to the display of the spectator device for viewing by the spectator.

The live event stream is transferred over the communication network and via the server of the data processing system to the spectators' devices. The streamed live event has a set of defined predictable event actions made available to the spectator. In an embodiment, wherein the live event stream is for example an online stream of a soccer match, the spectator can predict by selecting which of the predictable event actions will take place (e.g. a goal, yellow card, red card, etc.), by which player and when said action will be performed and how this action is performed (e.g. the goal is scored by using head or leg).

In another embodiment of the present disclosure, the streamed event is for example a war game, the spectator can predict for example which player and how (i.e. by which means, for example killed by an axe, or shotgun, etc.) will be killed (the first or second player). Alternatively, the streamed content may be any other live recorded and broadcasted event, such as any sports game (e.g. soccer, basketball, baseball, etc.), concert, movie, music video, live news, etc.

The spectator can also opt to unselect the at least one electronic prediction means. The term 'unselect' herein may be regarded as a request initiated by the participant, via the GUI of the display of the spectator device, for performing a countermanding operation to the previously made selection of the at least one electronic prediction means.

Furthermore, the spectator may propose a diagnostic and rectification protocol to the server if any electronic prediction means have been erroneously provided. If the electronic prediction means provided to the spectator is, deviant beyond a certain pre-defined relevancy threshold criteria of the ongoing live event, the spectator may merely suggest to the server, via appropriate inputs on the GUI of the display of the spectator device, that the electronic prediction means has been erroneously provided and that the diagnostic and rectification protocol be executed for generating a less deviant, or stated differently, a more relevant or accurate electronic prediction means corresponding to the live event stream.

In an example, if the live event category selected by the spectator is for example football, but the electronic prediction means provided to the spectator is that of an e-sports or another sport, then the spectator may suggest to the server, via appropriate inputs on the GUI of the display of the spectator device, that the electronic prediction means has been erroneously provided and that the diagnostic and rectification protocol be executed for providing the relevant or accurate electronic prediction means to the spectator.

In another example, if the live event category selected by the spectator is football and the live event stream of the football game is provided to the user. However, player A has been dismissed in the first half of the game, for instance, due to a red flag issued by a referee of the football game, and an electronic prediction means provided to the spectator is representative of a specific event action that has been predicted erroneously, for instance, that player A will score a goal in the second half, then in such cases, the spectator may suggest to the server, via appropriate inputs on the GUI of the display of the spectator device, that the electronic prediction means has been erroneously provided and that the diagnostic and rectification protocol be executed for providing the relevant or accurate electronic prediction means to the spectator. Any type of erroneous electronic prediction means may be reported by the spectator, via the GUI of the spectator device; to the server for mere correction, substitution, or elimination and thereby provide a relevant or accurate electronic prediction means to the spectator.

Detecting the event actions comprises detecting triggering actions are detected by implementing a software interface library configured to interface with the game being played or analyze the data or the state of the game being played. In another embodiment detecting the event actions further comprises detecting triggering actions by performing at least one of: an audio and video recognition and analysis of the live event stream or by using real time statistics feed of live event stream. In an embodiment, the at least one server is further configured to detect the event actions comprising triggering actions by implementing a software interface library. This software interface library may reside on, for example, on the event participant device or on the server. The software interface library may comprise any number of collections of precompiled routines that the server or the event participant device can use to execute in order to detect triggering actions from the received data stream.

In an embodiment, the at least one of the servers is further configured to detect the event actions comprising by performing at least one of: an audio and video recognition and analysis of the live event stream or by using real time statistics feed of live event stream. The audio and video recognition and analysis of the live event stream may be developed using one or more software libraries and tools packages commonly known to persons skilled in the art. Moreover, such software application packages may be beneficially implemented or associated with deep learning modules software application packages to achieve, inter alia, an improved signal noise ratio, or to interpret speech in a live event stream, e.g., in a live event stream comprising TV news.

Further, the data processing system is configured to generate sub-event attributes based on the detected triggering actions. In the example of the goal scored by player A, the generated sub-event attributes may include attributes related, amongst other things, to a run-up by player A before kicking the ball, the kicking of the ball by player A for scoring the goal, any fouls committed in the manner of play by player A while attacking another player B, handling the ball, or scoring the goal, or fouls that may have been committed by any of the other players in the football game. In the example of the kill made by the participant of team A for eliminating the opponent the participant of team B in an e-sports event, the generated sub-event attributes may include attributes related, amongst other things, to a time of the killing, a place at which the killing occurs or a manner of killing.

In an embodiment, the data processing system is configured to generate the sub-event attributes by receiving feedback on the generated sub-event attribute from one or more spectators of the live event stream and updating the generated sub-event attribute for subsequent use based on the received feedback. In this embodiment, the spectator is allowed to provide feedback on the generated sub-event attribute as part of a learning process to the machine learning algorithm.

In an example, if the live event stream depicts a footballer making a mid-field kick, but the sub-event attribute generated by the data processing system is that of a corner kick, the spectator may provide feedback to the machine learning algorithm, via appropriate inputs or commands using the spectator device to the server, that the generated sub-event attribute is irrelevant or inaccurate. Upon receiving the feedback from the spectator via the spectator device, the server can update the generated sub-event attribute for subsequent use based on the received feedback and generate relevant or accurate sub-event attributes during a subsequent live event stream.

In an embodiment, the electronic prediction means comprise one or more defined selectable objects or selectable fields. Each of the defined selectable objects presents at least one defined predictable event action, and each of the defined selectable objects comprises at least one sub-event attribute. In an example, a first selectable object or selectable field for a live event category of football may comprise the defined predicted event action of player A scoring a goal mid-field and the predicted event action of player A scoring the goal mid-field may comprise the sub-event attribute of scoring the goal by kicking the ball, or alternatively, scoring the goal by using a headshot.

The prediction environment engine of the server and/or the spectator device are operable to compare the generated data of the event actions being predicted and the generated sub-event attributes to identify the prediction results by using a first timestamp and a second timestamp. The first timestamp is assigned by the data processing system for a detected event action and the second timestamp is assigned by the data processing system for a corresponding prediction made by a spectator. The timestamps are used by the data processing system to ensure that the spectator's prediction is correct only if the prediction was made prior to the event happening. There may be buffer applied by the data processing system to either direction in comparing the first timestamp and the second timestamp. The prediction environment engine and/or the spectator device may be configured to perform such comparison by one or more logical routines that are implemented for execution by the server and/or the spectator device. In an example, if the generated data of the predicted event actions indicate that an event action (e.g. a corner kick in a soccer match, a kill in a computer video game, etc.) will be made by player A for scoring and the generated sub-event attributes are representative of the corresponding event action, then the server and/or the spectator device may identify the prediction result as being true (or positive). If upon comparison, the server and/or the spectator device determines that any part of the generated sub-event attributes is non-compliant i.e., is not in conformity with the data generated for the predicted event actions (condition or prediction), then the server and/or the spectator device may identify the prediction result as being false (or negative). Such comparison enables the server and/or the spectator device to accurately identify the prediction result and to notify spectators of the identified prediction result, as disclosed later herein.

The server is configured to display the identified prediction result on the display of the spectator device. By displaying the prediction result to the spectator, the spectator is made aware of the prediction result. The prediction result obtained from comparison may be positive or negative in nature to an outcome with regards to any predictions made through selection of one or more electronic prediction means by the spectator.

Moreover, in an embodiment, the live event stream is video game, e-sports, game, sport, live concert, live news or live TV show event stream. The video game can be any type of game (i.e. a livestream of someone playing a computer game or a group playing poker. For example, the live event stream may include a stream obtained from a live game of "Call of Duty®", from a sports event (e.g. a live game of football). Therefore, it will be acknowledged by persons skilled in the art that a type of live event, to which the live event stream corresponds, is non-limiting of this disclosure. Any type of live event known in the art may be implemented for realizing embodiments disclosed herein.

DETAILED DESCRIPTION OF THE DRAWINGS

With reference to the figure FIG. 1 a data processing system 100 for enabling a spectator to make predictions during a live event stream is illustrated in accordance with an embodiment of the present disclosure. The data processing system comprises at least one server 114 configured to communicate over the communication network 110 with one or more spectator devices 104 operable by a spectator 102 and one or more participant devices 112 operable by one or more participants (e.g. a streamer) 116 streaming the live event, wherein each of the spectator devices and the participant devices is configured to communicate with the server over the communications network. The server is accessed by the spectator devices initiated by the spectators, wherein there can be an arbitrary number of spectators for each live event. The server enables spectators to follow event streams and make predictions of possible actions in the live event. During the live event stream when the one or more participants streaming their own live event, they initiate to connect their participant devices directly to the server of the data processing system by sending the video stream and optionally a data stream to the server and optionally the participant devices may have a client software installed on their devices.

Figure 2:
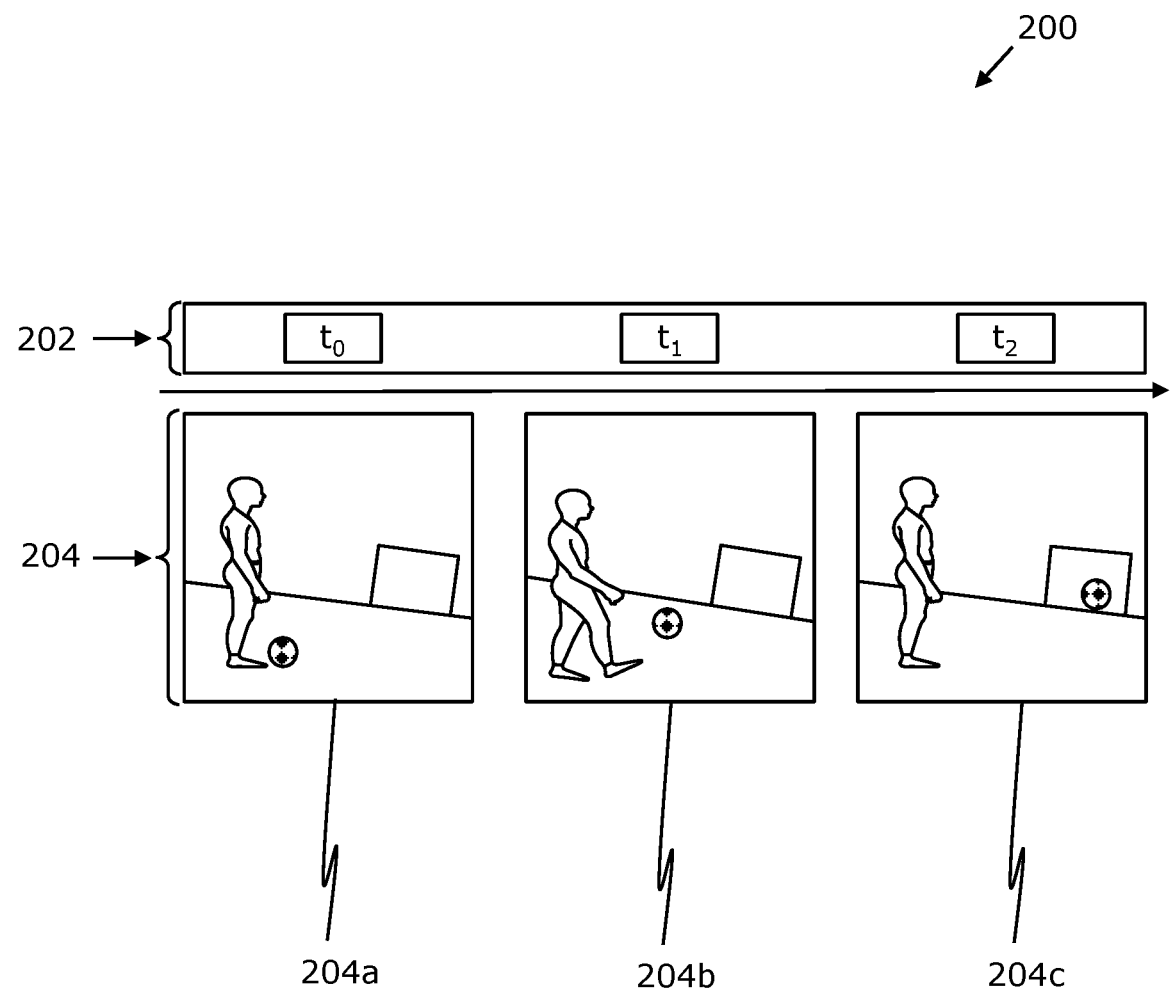
FIG. 2 is a schematic diagram illustrating a predictable event action taking place during the live event stream, in accordance with an embodiment of the present disclosure.

Referring to FIG. 2, a schematic diagram illustrating a predictable event action 204 taking place during the live event stream and processed by a data processing system is illustrated, in accordance with an embodiment of the present disclosure. As an example, the live event stream is a computer game, e.g. football game. At t0 a player as a participant of the live event is moving with a ball. At t1 the player kicks the ball. At t2 the ball goes into the goal. As shown, scenes of the event action 204a-204b are depicted in a time sequence 202 of predicted event actions, e.g., a player (of a specific individual identity or a specific team identity) scoring a goal. At time to, at first event action 204a of the live event the player is kicking a ball is processed by the data processing system. At time t1, at a second event action the player is shown at a moment when the ball is mid-way between the player and a goal processed by the data processing system. At time t2, at a third event action the player is shown at a moment when the ball is kicked to the goal and processed by the data processing system. According to the embodiment, an example of the predictions during the live event could be that which players will make the next goal (or in another embodiment for example which weapon will (in war game) a first player uses against a second player). The predictions can be temporal i.e. the spectator can make a prediction that certain event action will take place within a time period not exceeding t1 or event takes place between t2-t3 or for example after t4.

When the spectator has made a selection to make predictions for the certain live event, then making the selection initiates the data processing system to provide the spectator a set of electronic prediction means depending on a live event category of the selected live event and live event specifics, i.e. characteristics of the selected event, types of actions that may happen during the selected event, live event mode, rules of different situations of the live event (e.g. tournament rules). The event actions in the live event category might be for example a goal, a corner kick, a red card, a pass, etc. The spectator may receive, after corresponding initiation in the prediction environment installed to the spectator device or made available to the spectator device via a web browser or an application interface, to the prediction environment from the server a fixed amount of electronic prediction means, a random amount of electronic prediction means, a number of electronic prediction means depending on the specific spectator such as data on the spectator's prior use of the system, spectator's prior predictions or the electronic prediction means provided to the spectator, number of electronic prediction means related to resources of the spectator such as credit points. All or some of the electronic prediction means are shown in the first area of the user interface of the prediction environment. The live event stream from the live event is rendered in the user interface of the prediction environment. The spectator can select one or more electronic prediction means to make predictions on what is going to happen in the event. As an example, the spectator can make a prediction that a player will make a goal by selecting corresponding electronic prediction means. The selection must be done before time t2, i.e. before the event actions take place. If the selected electronic prediction means correctly predict what happens then the spectator is provided with resources, rewards or prizes or given other feedback such as points or additional electronic prediction means. If the prediction fails then the spectator may lose points, resources or the corresponding electronic prediction means. An amount of given or lost resources can be dependent on the specific electronic prediction mean used by the spectator, wherein certain electronic prediction means may have higher weights than others, which may cause higher awards or higher penalties, on the live event category or it can be a function of time i.e. if the spectator makes a prediction for example already before t1 that there will be a goal might give the spectator better benefit than making prediction just a few seconds before time t2.

Figure 3:
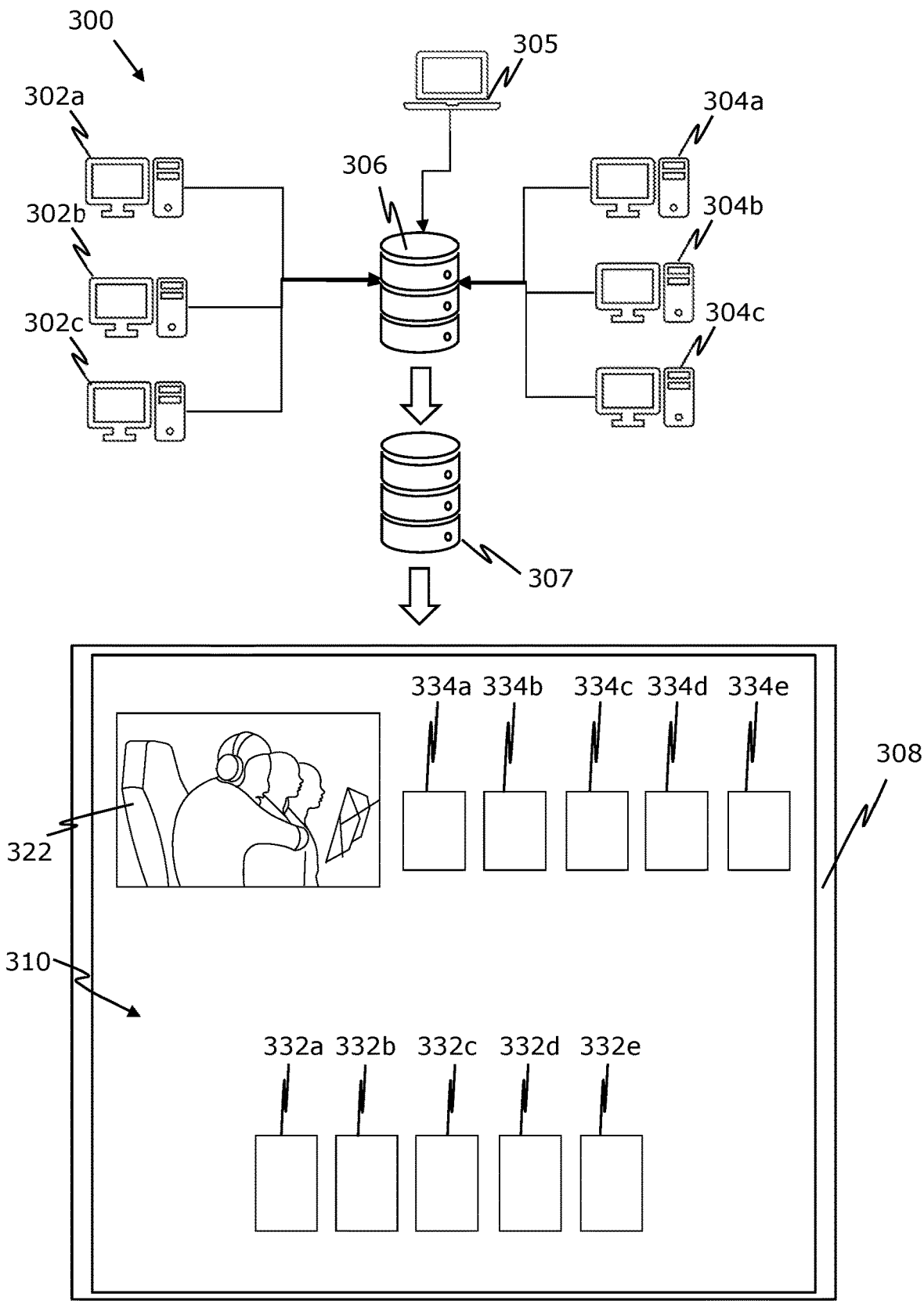
FIG. 3 is a schematic diagram of the data processing system illustrating a graphical user interface of a first area of a prediction environment comprising electronic prediction means displayed in a spectator device in accordance with an embodiment of the present disclosure.

FIG. 3 illustrates an embodiment of a GUI of a prediction environment of a spectator device 308 having a display 310 that exemplarily displays a set of electronic prediction means 332a, 332b, 332c, 332d, 332e on a first area of a prediction environment, wherein the spectator can select one or more electronic prediction means to predict the actions in the live event stream to be streamed and a set of selected electronic prediction means 334a, 334b, 334c, 334d, 334e on a second area of a prediction environment selected by the spectator, by using the spectator device 308, from the set of electronic prediction means 332a-332e. The selected electronic prediction means correspond to the event actions the spectator predicts that going to happen during the live event stream and comprise the sub-event attributes of the predictable event actions. The electronic prediction means provided to the spectators are for example selectable objects or selectable fields in the electronic form. The electronic prediction means correspond to actions taking place during the live event stream.

As shown, a first set of participant devices 302a, 302b, 302c are operable by a first group of players team A, and a second set of participant devices 304a, 304b, 304c are operable by a second group of players team B, wherein the first group of players team A playing an online game with a second group of players team B.

The data processing system 300 comprises a server 307 that is configured to receive the live event stream from one or more participant devices of the participants of each group of participants 302a-302c and 304a-304c operable by the participants, e.g. game players, and/or from the means for transferring the live event stream 306 and/or from the observer device 305 and is further configured to transfer the received live event stream to the one or more spectator devices 308 of the spectators who are watching the streamed live event on their spectator devices 308 and making the predictions, wherein the one or more spectator devices 308 is for example a laptop, a smartphone, a computer, a smart glasses. The live event stream received from the participant devices of each group of participants 302a-302c and 304a-304c via the means for transferring the live event stream 306, by the server 307 comprises the live video stream of the live event and optionally the data stream. Any number of servers may be used and any number of spectator devices may form part of the data processing system.

As shown in the exemplary diagrammatic illustration of FIG. 3, a video stream is displayed in a first portion 322 of the display 310 of a spectator device 308, wherein the video stream can be for example an ongoing event stream from any of the participant devices 302a, 302b, 302c or 304a, 304b, 304c or from an observing device 305 that is observing the match, a video stream of the participants during the break of the streamed event, a commentators video stream received from the means for transferring the event stream via the server of the data processing system or received directly from the data processing system. The observing device 305 is a device of a someone connected to the game server, and to the game that's being played, but who can only observe the game and not play it, e.g. a camera man inside the game. The observing device may be a game client, where its user can't play the game, but instead that user can move around freely in the game and view the game from any participant's point of view. The video from the observing device is captured and sent thru the means of transferring the live event stream 306 to the server 307.

The user interface view of the first area of the prediction environment rendered in the display of the spectator device comprises a view port for rendering video stream. The video stream transferred via the means for transferring the live event stream 306, e.g. from live event recording system directly. In the first area of the prediction environment in which at least one electronic prediction means, e.g. the selectable object is rendered. The spectator can select one or more of the selectable objects and mark the desired electronic prediction means of the provided electronic prediction means as selected electronic prediction means, by performing a pointer click or touch on the desired electronic prediction means. Each of the electronic prediction means are associated with an event action to be predicted and a set of rules defining the amount of resources allocated for the spectator if the predicted event action takes place in the live event stream within a defined time window.

Figure 4:
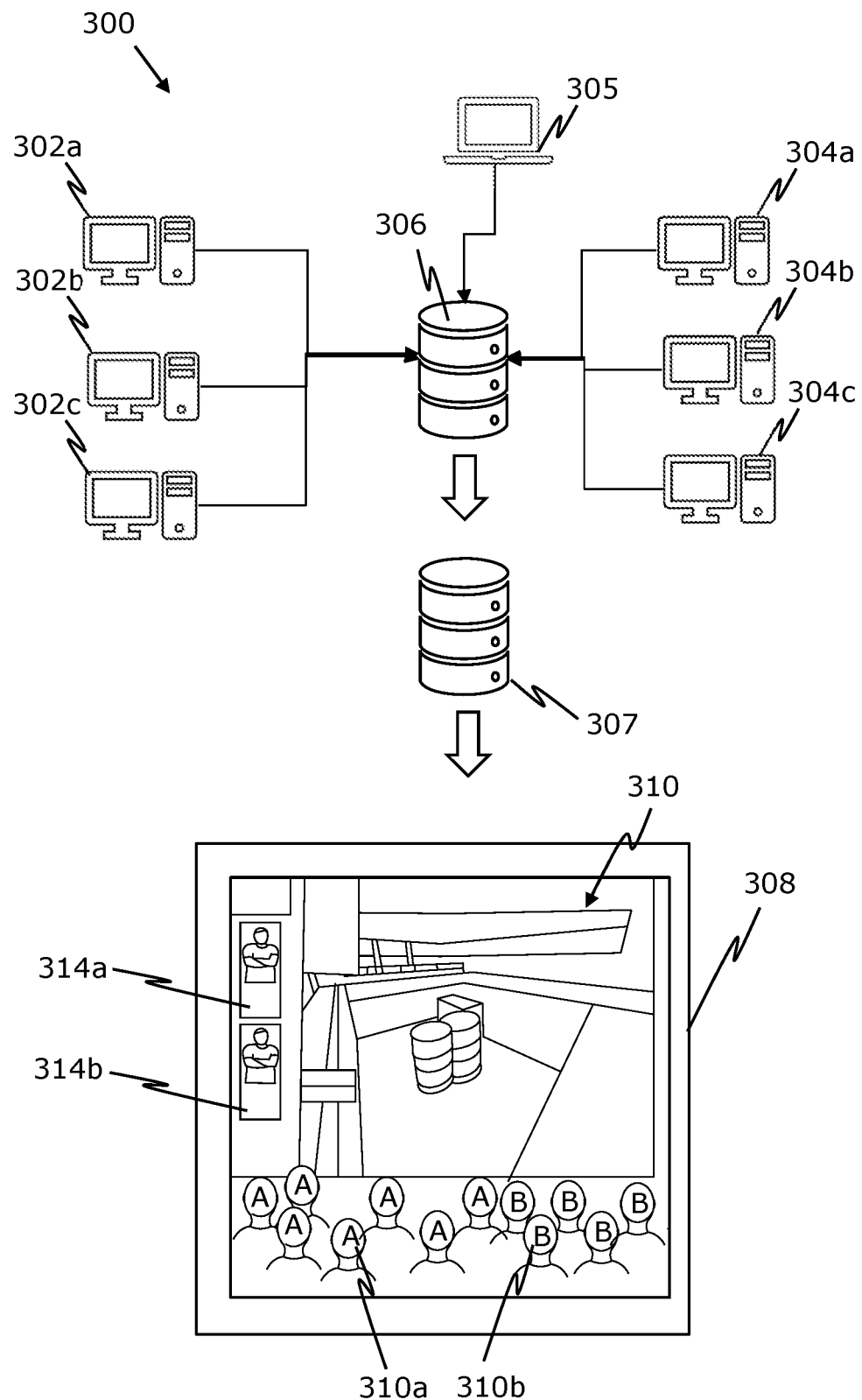
FIG. 4 is a schematic diagram of an exemplary configuration of the data processing system illustrating a graphical user interface of a second area of a prediction environment comprising electronic prediction means displayed in a spectator device, in accordance with an embodiment of the present disclosure.

FIG. 4 shows a schematic diagram of an exemplary configuration of the data processing system 300 illustrating a GUI of a second area of a prediction environment comprising electronic prediction means displayed in a spectator device, in accordance with an embodiment of the present disclosure for making predictions on e-sports event. As shown, a first set of participant devices 302a-302c are operable by a first group of players team A, and a second set of participant devices 304a-304c are operable by a second group of players team B, wherein the first group of players team A playing an online game with a second group of players team B.

The data processing system 300 comprises a server 307 that is configured to receive the live event stream from one or more participant devices of the participants of each group of participants 302a-302c and 304a-304c operable by the participants, e.g. game players, and/or from the means for transferring the live event stream 306 and/or from the observer device 305 and is further configured to transfer the received live event stream to the one or more spectator devices 308 of the spectators who are watching the streamed live event on their spectator devices 308 and making the predictions, wherein the one or more spectator devices 308 is for example a laptop, a smartphone, a computer, a smart glasses. The live event stream received from the participant devices of the participants of each group of participants 302a-302c and 304a-304c via the means for transferring the live event stream 306, by the server 307 comprises the live video stream of the e-sports match. Any number of servers may be used and any number of spectator devices may form part of the data processing system.

The figure FIG. 4 shows the GUI of a spectator device for viewing the live event streamed and for making the predictions and illustrates the spectators' devices 308 configured to display a second area of the prediction environment on a GUI of the spectator device, to receive the live event stream and display the received live event stream together with a second area of the prediction environment on the GUI, wherein the second area of the prediction environment is superimposed to the live event stream as an overlay graphics and the prediction environment comprises live video stream (e.g. live computer game), electronic prediction means, which is displayed on the display of the spectator's device. The GUI is configured to receive inputs or commands from the spectator to facilitate, for example, making predictions. Additionally, one or the spectator device may include other types of input devices such as, but not limited to, a keyboard, a mouse, and the like.

Individual spectators may form groups, wherein the members of the groups can cooperate, discuss and make predictions together, share electronic predictions means with other members of the group, pool the points together or co-operate in other ways (e.g. sharing tactical information), compete within the group (e.g. comparing who is most successful in predicting) and compete with other groups. An example of such groups is shown in the FIG. 4 where individual spectators choose to support a group of live event participants, e.g. a team A of game players or a team B of game players, or be categorically classified as supporting team A or team B (based on individual selections of the electronic prediction means 314, e.g., selectable objects by each spectator for respective ones of the predicted event actions, e.g., a kill in a basement portion of a warehouse by respective ones of the teams A and B i.e., players from team A and team B respectively), and are digitally depicted on the display 310. The digital depictions of individual spectators may reflect the spectators' previous use of the system, based on spectators' performance in prediction either as an individual or within a group of the spectators, or be affected by participants' actions or interactive options selected by the participants. The digital depictions of the individual spectators may be visually depicted in a graphical prediction environment, such as a virtual stadium, which may change based on the spectators' previous use of the system, based on spectators' performance in prediction either as an individual or within a group of the spectators, or be affected by participants' actions or interactive options selected by the participants. As such, the live event stream is also digitally depicted in the display 310 which may also be presented in the graphical environment as an object such as a virtual jumbotron. Although in the foregoing example, participants are divided into teams A and B respectively, in other examples, more than two teams may be formed based on the specific game, e.g., when the players play in a multiplayer e-sports (i.e., multiplayer online game) in which multiple teams i.e., more than two teams compete against each other. The electronic prediction means e.g., selectable objects 314a and 314b for making the prediction.

In operation, spectators supporting each of the teams A and B, wherein each one of the spectators is presented as a character 310a, 310b on the display 310, may also be dynamically populated in real-time based on the individual selections of the electronic prediction means e.g., the selectable objects 314a, 314b by each of the spectators for the predicted event action, i.e., the kill by players of team A or team B respectively.

Such a configuration of the prediction environment presented in the user interface of the spectator is merely exemplary in nature and hence, non-limiting of this disclosure. In alternative implementations, any manner of rendering graphics for the live event stream known to persons skilled in the art may be implemented in lieu of the foregoing example. For example, an overlaying or superimposing technique may be adopted in an intermittent or a continuous manner.

Figure 5:
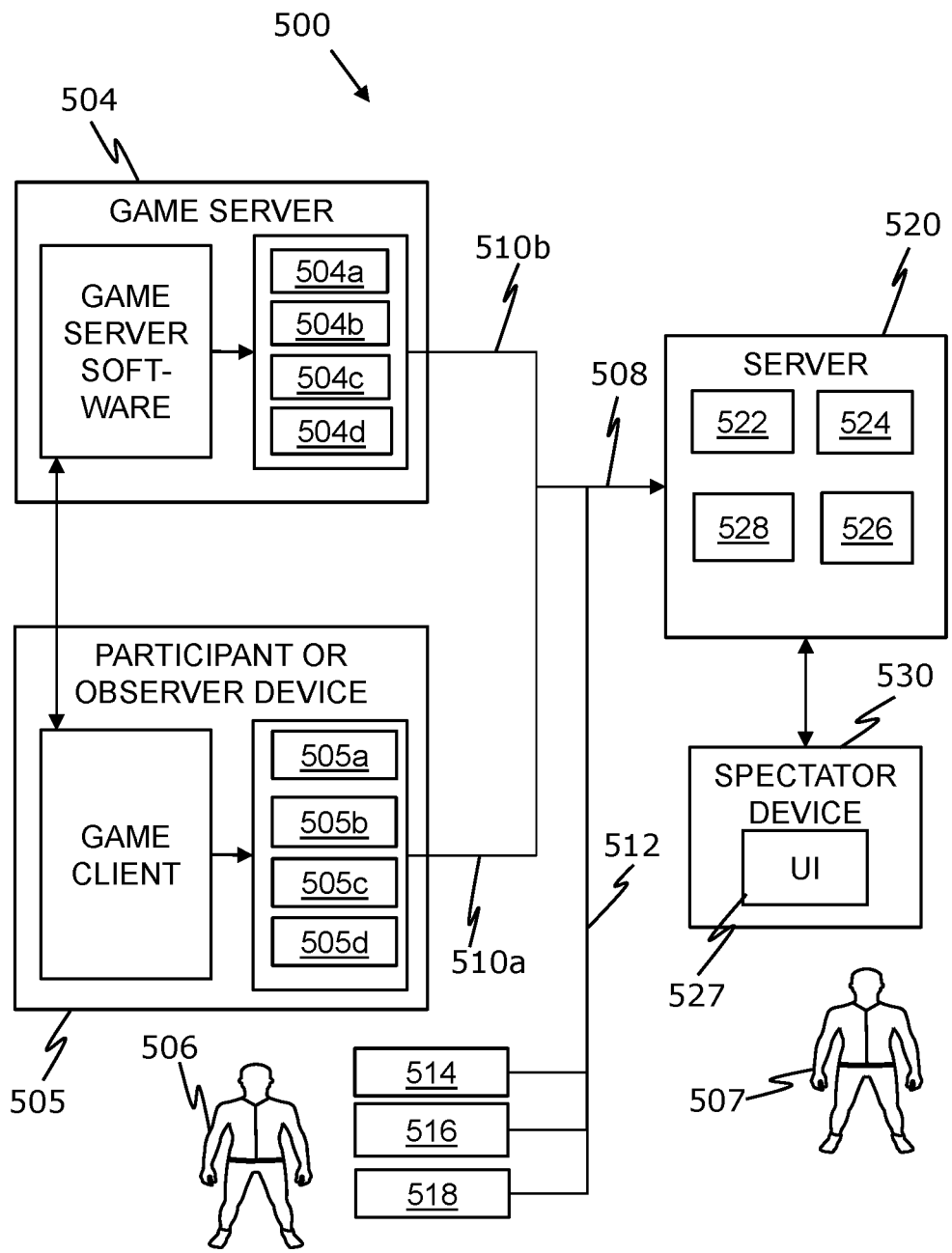
FIG. 5 is a schematic showing an exemplary architecture of the data processing system, in accordance with an embodiment of the present disclosure.

Referring to FIG. 5, an exemplary architecture of the data processing system 500 is depicted in accordance with an embodiment of the present disclosure illustrating the functionalities of the data processing system and spectator device. In the exemplary implementation of the architecture of the data processing system 500 disclosed herein, the data processing system 500 comprises of a third-party (e.g. game publisher or event organizer operated) game server 504, that is running the game server software, and may comprise a first raw game data capture module 504a, a first event data API 504b, a first software interface library 504c, a first game video capture module 504d; one or more participant and/or observer devices 505, that is running the game client software and is operable by one or more participants or observers 506, and such device 505 may comprise a second raw game data capture module 505a, a second event data API 505b, a second software interface library 505c, a second game video capture module 505d; one or more servers 520 and one or more spectator devices 530 connectable via communication network to the one or more servers 520.

The first and second raw game data capture modules 504a and 505b are operable to record, capture, read or otherwise extract game data from the game server software or from the game client and to send that game data to the server 520. The first and second event data API 504a and 505b allow the game server or the game client to use the API to send game data to the server 520. The first and second software interface library 504c and 505c can be integrated by the game server software or game client software to record game data and to send game data to the server 520. The first and second video capture module 504d and 505d are operable to capture the audio-video output of the game as it's played on the game server or in the game client and to send the captured video stream to server 520. The first and second video capture module 504d and 505d may be part of the data processing system, or these modules may be third party software (e.g. Open Broadcaster Software), which may be extended by modules of the data processing system to add functionality to these third party software components.

The one or more servers 520 is configured to receive the live event stream 508 thru the means of transferring the live event stream and comprising one or more live video and optionally data streams 510a from the one or more the participant or observer devices 505; and/or one or more live video and optionally data streams 510b from one or more game servers 504; and optionally one or more live video streams 512 of the one or more participants' camera 514 (such participant camera may be embedded in the participant or observer device 505), of a commentator stream 516 and/or audience or another live stream 518 (e.g. a camera in the audience, TV production studio or some other recording system).

The one or more servers 520 comprises an object and event detection engine 522 for analyzing live event stream, generating and analyzing sub-event attributes and any feedback received from one or more spectator 507, a prediction processor 524 configured to compare the predictions made by the spectators and the event actions detected from the live event stream, a prediction environment engine 526 configured to provide a prediction environment comprising electronic prediction means to the user interface 527 of the spectator device 530, and optionally a rendering engine 528 to combine the live event stream 508, or any component video or data streams thereof, with the corresponding prediction environment to be sent to the one or more spectator devices 530 operable by one or more spectators 507 who are watching the live event stream and making predictions on predicted event actions of a live event in which participants 506 are participating. Alternatively, the rendering engine may be located on the spectator device or instead of rendering engine a user interface overlaid on top of or next to the live event stream is used. In the present embodiment the server renders video stream, the prediction environment and digital depictions of spectators and the spectator device renders user interface with prediction means, selecting those on top of that rendering. In an alternative embodiment the server doesn't perform rendering and transfers the live event stream, or some of the component video and/or data streams, to the spectator device, and the spectator devices renders everything including the GUI.

Figure 6:
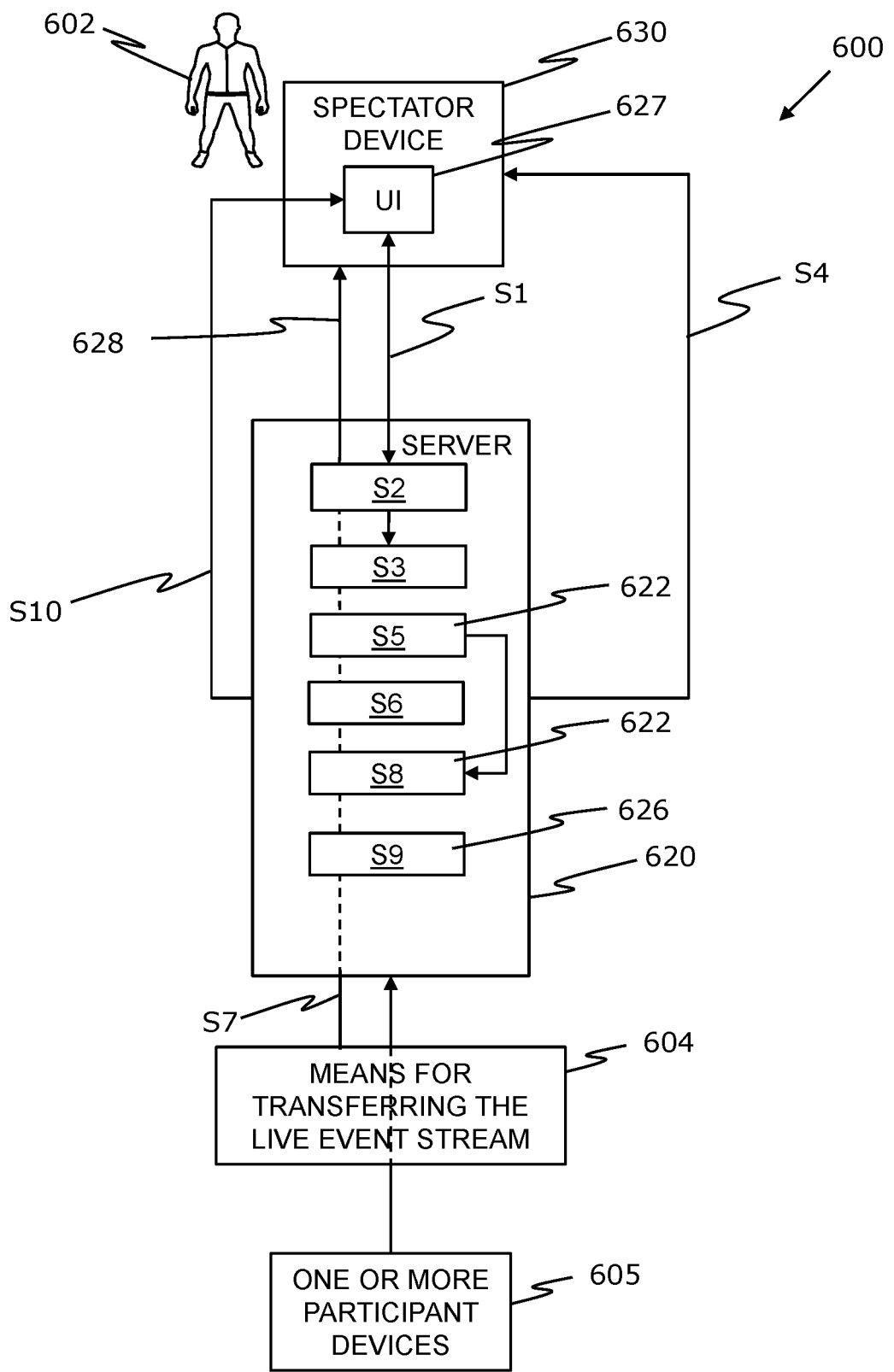
FIG. 6 is a flowchart of a method for enabling the spectator to make predictions during the live event stream, in accordance with an embodiment of the present disclosure.

FIG. 6 shows a flowchart that illustrates a method 600 of operating a data processing system, which enables a spectator to make predictions during the live event stream, in accordance with an embodiment of the present disclosure. As shown at step S1, the method 600 comprises defining a category of a live event to be streamed from the server to a prediction environment of the user interface 627 of a spectator device 630 communicating with a server 620 over a communication network. The spectator may use the spectator device 630 comprising a user interface for presenting a prediction environment provided to the spectator to provide appropriate inputs or commands to the server 620 for selecting the preferred live event streams to watch. The server 620 may, in turn, coordinate with the means for transferring the live event stream 604 to provide the ongoing live event stream and/or the prediction environment, based on the selection by the spectator, to the spectator device 630. In case the live event stream is not live yet, then just the prediction environment is provided to the spectator device.

At step S2, the method 600 further comprises defining by the server 620 a set of predictable event actions of the live event according to the event category of the selected live event stream that the spectator wants to watch, wherein the server is further configured to select a subset of the predictable event actions to be provided to the prediction environment in the user interface of the spectator device depending on the live event type in the corresponding event category the spectator wishes to watch. I.e. when a category and type of the live event to be streamed to the spectator is provided to the data processing system, the data processing system is configured to define what can be predicted based on the category and type of the corresponding event. For example if it's a specific multi-player first person shooter game, then there is a set of predictable actions specific to the corresponding game to be streamed; if it's a specific type of car racing live stream, then there is another set of predictable actions specific to that car racing event, etc. For the each type of event the data processing system may provide to spectator device always the same set of prediction options, or the data processing system may choose each time different prediction options and/or it may provide different options for different spectators. The server 620 is configured to execute instructions to define the set of predictable event actions and corresponding rules, wherein the set of predictable event actions may comprise one or more sub-sets of predictable event actions according to the one or more different type of events in the corresponding event category, in the live event based on the spectator's desired and chosen category of the live event.

At step S3, the method 600 further comprises associating by the server 620 each predictable event action of the set of defined predictable event actions with an electronic prediction means to be provided to the spectator. The server 620 is configured to associate each electronic prediction means, for example, each of the selectable objects with a predictable event action.

At step S4, the method 600 further comprises providing from the server 620 the electronic prediction means, e.g., the selectable objects, associated with the defined predictable event actions to at least one spectator device 630 of at least one spectator.

At step S5, the method 600 further comprises generating a data stream of predictable event actions from the video of the live event to be streamed by the object and event detection engine 622 of the server 620 by using machine learning algorithm on the live event stream, by analyzing and/or by using machine learning algorithm on game data received from the game server or the game client thru API, as raw data or by thru software interface library, or by other data sources.

At step S6 the method 600 further comprises recording in a database of the server 620 the data of the event actions being predicted, from the at least one spectator device 630, wherein the predictions being made by the spectator 602 by selecting one or more electronic prediction means presented by the data processing system in the prediction environment in the user interface 627 of the spectator device 630.

At step S7, the method 600 further comprises streaming the live event corresponding to the defined category of the live event received from the means for transferring the live event stream 604 by the server 620 to the at least one spectator device 630 of the at least one spectator.

At step S8, the method 600 further comprises detecting by the object and event detection engine 622 of the server 620 event actions from the data stream generated in step S5.

At step S9, the method 600 further comprises comparing by the prediction environment engine 626 the recorded data of the event actions being predicted and the detected event actions from the generated data stream to identify the prediction results by server 620.

At step S10, the method 600 further comprises displaying the identified prediction result and possible rewarding the spectator with resources in a prediction environment of the user interface 627 of the at least one spectator device 630 via the prediction environment.

It will be understood by persons skilled in the art that figures FIG. 1, FIG. 3, FIG. 4 and FIG. 5 illustrate simplified configurations of the data processing system 100 and exemplary architectures 300 and 500 thereof, and such simplified configurations of the data processing system 100 and exemplary architectures 300 and 500 should not unduly limit the scope of the claims herein. In fact, upon perusal of the present disclosure, persons skilled in the art will recognize many variations, alternatives, and modifications of embodiments of the present disclosure. Further, features disclosed in one embodiment may be combined with one or more features disclosed in another embodiment. Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of operating a data processing system for making predictions during a video game stream, wherein the video game stream comprises a video stream and the video game stream is received from a means capturing the video game in a first server, the method comprising the steps of:
  defining a sub-category of the video game to be streamed from the first server to at least one spectator device;
  pre-defining a set of predictable event actions of the video game according to the defined sub-category of the video game before streaming the video game corresponding to the defined sub-category of the video game;
  associating each predictable event action of the set of defined predictable event actions with an electronic prediction means;
  providing the electronic prediction means associated with the set of defined predictable event actions to at least one spectator device;
  generating a data stream of the predictable event actions from event data from participant devices of video game event participants, wherein the generated data stream is derived from one or more of:
    video streams of the video game streams, originating from the devices of one or more participants, who are competing individually or against others;
    video or data streams from one or more participant devices having a game client running game client software; or
    video or data streams from one or more game servers coupled to the game client; and
  recording in the first server a data of the predictable event actions from the at least one spectator device;
  streaming the video game corresponding to the defined sub-category of the video game received from the means capturing the video game by the first server to the at least one spectator device;
  detecting event actions from the generated data stream by a real time object and event detection engine;
  comparing in real time the recorded data of the event actions being predicted and the detected event actions from the generated data stream to identify the prediction results;
  displaying the identified prediction result in a user interface of the at least one spectator device;
  wherein the first server is configured to determine delays in distributing the generated data stream and to accordingly synchronize distributing the generated data stream and engagement in predictions.

2. The method according to claim 1, wherein generating the data stream of predictable event actions from the event data source comprises generating the data stream from the video of the video game to be streamed, an application program interface, a software development kit or combination thereof.

3. The method according to claim 1, wherein generating the data stream is performed by analyzing the video game stream using a machine learning algorithm based on at least one object or event detection technique.

4. The method according to claim 3, wherein using the machine learning algorithm further comprises training the machine learning algorithm by using an event replay data for generating the data and video streams.

5. The method according to claim 1, wherein generating the data stream is performed by analyzing in the first server the event data received from the one or more participant devices, from one or more video game servers or from the means capturing the video game stream.

6. The method according to claim 1, wherein generating the data stream further comprises receiving one or more of: event-based analysis, event-based statistics, and event-based commentary.

7. The method according to claim 1, wherein detecting the event actions comprises detecting triggering actions by implementing a software interface library configured to interface with the video game being played and configured to analyze the data or the state of the video game being played.

8. The method of according to claim 1, wherein detecting the event actions further comprises detecting triggering actions by at least one of:
  performing an audio and video recognition analysis of the video game stream; or
  using a real time statistics feed of the video game.

9. The method according to claim 1, wherein detecting the event actions further comprises detecting sub-event attributes by receiving feedback on the generated sub-event attribute from one or more spectators of the video game stream;
  and updating the generated sub-event attribute for subsequent use based on the received feedback.

10. The method according to claim 1, wherein generating the data stream comprises generating information about a type of action, location where the event action is predicted to take place, identity of a performer of the action, a time of occurrence of the corresponding predictable event actions in the video game stream or dependency on a preceding predictable event action.

11. The method according to claim 1, wherein providing the electronic prediction means comprise providing one or more defined selectable objects, and wherein each of the one or more defined selectable objects presents at least one defined predictable event action.

12. The method according to claim 1, wherein generating the data stream of predictable event actions further comprises: receiving at least one prediction input related to the defined predictable event actions from the at least one spectator device of the at least one spectator in response to the provided electronic prediction means associated with the defined predictable event actions; and processing the received at least one prediction input to generate data of event actions being predicted.

13. The method according to claim 1, wherein defining the sub-category of the video game comprises defining a type of the video game, or a specific game mode of the video game.

14. The method according to claim 1, wherein the method further comprises providing an award based on the identified prediction result.

15. A data processing system for making predictions during a video game stream, wherein the video game stream comprises a video stream and the video game stream is received from a means capturing the video game, the data processing system comprising:

at least one spectator device operable by the spectator; and at least one first server in communication with the at least one spectator device over a communications network, wherein at least one of the first servers is configured to:

define a sub-category of video game to be streamed from the first server to at least one spectator device;

pre-define a set of predictable event actions of the video game according to the defined sub-category of the video game before streaming the video game corresponding to the defined sub-category of the video game;

associate each predictable event action of the set of defined predictable event actions with an electronic prediction means;

provide the electronic prediction means associated with the set of defined predictable event actions to the at least one spectator device for selection by the at least one spectator;

generate a data stream of the predictable event actions from event data from participant devices of video game event participants, wherein the generated data stream is derived from one or more of:

video streams of the video game streams, originating from the devices of one or more participants, who are competing individually or against others;

video or data streams from one or more participant devices having a game client running game client software; or video or data streams from one or more game servers coupled to the game client; and record a data of the predictable event actions from the at least one spectator device;

stream the video game corresponding to the defined sub-category of the video game received from the means capturing the video game to the at least one spectator device;

detect event actions from the generated data stream by a real time object and event detection engine;

compare in real time the recorded data of the event actions being predicted and the detected event actions from the generated data stream to identify the prediction results;

display the identified prediction result in a user interface of the at least one spectator device;

wherein the first server is configured to determine delays in distributing the generated data stream and to accordingly synchronize distributing the generated data stream and engagement in predictions.

16. The data processing system according to claim 15, wherein the event data source comprises the data stream from the video of the video game to be streamed, an application program interface, a software development kit or combination thereof.

17. The data processing system according to claim 15, wherein at least one of the first servers or the spectator devices is operable to generate the data stream by analyzing the video game stream using a machine learning algorithm residing thereon, the machine learning algorithm based on at least one object and event detection technique.

18. The data processing system according to claim 15, wherein the at least one first server is further configured to train the machine learning algorithm by using an event replay data for generating the data and video streams.

19. The data processing system according to claim 15, wherein the at least one first server is further configured to receive the data stream comprising one or more of: event-based analysis, event-based statistics, and event-based commentary.

20. The data processing system according to claim 15, wherein the at least one first server is further configured to detect the event actions by implementing a software interface library.

21. The data processing system according to claim 15, wherein the at least one of the first server is further configured to detect the event actions comprising triggering actions by at least one of:

performing an audio and video recognition analysis of the video game stream; or using a real time statistics feed of the video game.

22. The data processing system according to claim 15, wherein the at least one of the first server or the spectator device is configured to generate the sub-event attributes by: receiving feedback on the generated sub-event attribute from one or more participants of the video game stream; and updating the generated sub-event attribute for subsequent use based on the received feedback.

23. The data processing system according to claim 15, wherein the data stream for at least one of the predictable event actions, provided by at least one of the first server or the spectator device, comprises information about a type of action, location where the event action is predicted to take place, identity of a performer of the action, and a time of occurrence of the corresponding predictable event actions in the video game stream.

24. The data processing system according to claim 15, wherein the electronic prediction means comprise one or more defined selectable objects, and wherein each of the one or more defined selectable objects presents at least one defined predictable event.

* * * * *